United States Patent [19]

Barmakian

[11] Patent Number: 5,766,711
[45] Date of Patent: Jun. 16, 1998

[54] COMPOSITE CAMEL STRUCTURE AND METHOD FOR MANUFACTURE

[76] Inventor: Andrew Barmakian, 10084 Big Pine Dr., Alta Loma, Calif. 91701

[21] Appl. No.: 705,120

[22] Filed: Aug. 29, 1996

[51] Int. Cl.⁶ .............................. B63B 59/02; B63B 35/44
[52] U.S. Cl. ...................... 428/36.5; 405/212; 405/215; 405/216; 114/219; 114/267; 264/45.6; 264/45.9; 264/46.1; 264/46.4; 264/512; 264/513; 264/514; 264/515; 264/516; 264/519; 264/145; 264/154; 264/155; 264/156; 264/166; 264/171.12; 264/171.26; 264/209.1; 264/209.3; 264/209.7; 264/241; 264/250; 264/255
[58] Field of Search .................................. 405/212, 215, 405/216; 114/219, 267; 428/36.5; 264/45.6, 45.9, 46.1, 46.4, 512, 513, 514, 515, 516, 519, 145, 154, 155, 156, 166, 171.12, 171.26, 209.1, 209.3, 209.7, 241, 250, 255

[56] References Cited

U.S. PATENT DOCUMENTS

| | | | |
|---|---|---|---|
| 3,113,546 | 12/1963 | Mountcastle | 114/219 |
| 3,455,269 | 7/1969 | Dean | 114/219 |
| 3,736,759 | 6/1973 | Blöse | 61/54 |
| 4,146,562 | 3/1979 | Fukushima et al. | 264/455 |
| 4,187,352 | 2/1980 | Klobbie | 521/79 |
| 4,351,786 | 9/1982 | Mueller | 264/46.7 |
| 4,485,057 | 11/1984 | Kristensson et al. | 264/45.7 |
| 4,604,250 | 8/1986 | Ecker | 264/35 |
| 4,762,584 | 8/1988 | Andreasen et al. | 156/245 |
| 4,824,627 | 4/1989 | Hammer et al. | 264/211.21 |
| 5,051,285 | 9/1991 | Borzakian | 428/36.4 |
| 5,180,531 | 1/1993 | Borzakian | 264/45.3 |

Primary Examiner—Frederick Krass
Attorney, Agent, or Firm—Sheldon & Mak

[57] ABSTRACT

A composite camel structure includes an elongate hollow, rigid cylindrical core, opposite ends of the core having respective caps sealingly connected thereto, a buoyant material of cured urethane foam substantially filling the core and being sealingly enclosed therein. A cushion is thermally bonded to and sealingly surrounds the core, the cushion having a substantially unbroken outside surface, being formed of a polymeric component consisting of polyethylene being at least 80 percent low-density polyethylene, and a process additive component including an effective amount of an ultraviolet inhibitor. A pair of parallel-spaced, transversely oriented guides extend between opposite sides of the cushion in axially spaced relation to the core, each guide defining a guide opening through the cushion for receiving hawser chains whereby the camel structure rides up and down with the tide. Also disclosed are a mold apparatus including a mold unit, a plurality of support members, a pair of spacer fittings, and a coolant conduit; and a method for forming the camel structure.

19 Claims, 5 Drawing Sheets

COMPOSITE CAMEL STRUCTURE AND METHOD FOR MANUFACTURE

BACKGROUND

The present invention relates to marine dock accessories, and more particularly to fender devices such as camels that are used for cushioning dock structure from being impacted by moored ships and other watercraft.

Camels are generally cylindrically shaped floating objects that are tethered alongside dock structure such as pilings. Traditionally, camels are large logs having a spaced pair of transverse openings bored therethrough, respective tethering chains or other flexible members that are suspended from the dock extending through the openings to corresponding weights that apply tension to the chains. The camel is guided in proximity to the pilings by sliding contact with the chains during changes in water level as are normally associated with tides, waves, and the like.

Wood as a material of camels and fender pilings is plagued by wear and tear as well as being attacked by wood boring marine organisms. Wood pilings and camels are typically treated with creosote (toxic), but even this material can be ineffective against modern marine borers. These marine borers can only be stopped by wrapping the wood pilings in plastic coverings. However, thin plastic coverings cannot withstand much wear and tear, especially abrasion from normal vessel contact. So wooden fender members often have thick plastic wrappings, which are expensive to provide. Moreover, the thick plastic wrappings of the prior art are ineffective in excluding parasites; therefore, the thick plastic coverings are typically used in combination with a thin plastic wrap, with a further cost penalty.

Concrete and steel are conventionally used as replacements for wood in pilings, telephone poles, and the like. However, these alternative materials have disadvantages, particularly as applied to camels. Concrete and steel pilings, for example, are heavy and awkward to maneuver. Neither concrete nor steel pilings make good fending pilings because neither is "forgiving" when impacted. Under impact, steel bends and buckles and concrete shatters. Both concrete and steel pilings are expensive to repair. Furthermore, steel, either standing alone or as a reinforcement in poured concrete, is subject to corrosion. Due to the weight of steel pilings, they can be difficult to transport.

U.S. Pat. Nos. 5,051,285 and 5,180,531 to Borzakian disclose a composite structure for pilings and telephone poles, including a tubular steel core and a thick molded plastic covering. The structure of Borzakian is unsuitable for camels for a number of reasons, including the following:

1. It is ineffective for cushioning in that the steel core extends to or beyond both end extremities of the plastic;
2. It is subject to deterioration in that water is not excluded from the interior of the core, and in that the plastic coating is subject to cracking during cooling in the molding process;
3. It is ineffective for use as a camel in that the plastic coating is not sufficiently buoyant for floating the structure.

Thus there is a need for a camel that is not subject to deterioration, that is effective for protecting docks and tethered watercraft from impact damage, and that is economical to produce.

SUMMARY

The present invention meets this need by providing a camel having a particularly advantage us composite structure. In one aspect of the invention, a buoyant camel structure includes a sealed elongate tubular core element, a cylindrical cushion member covering the core element to a depth of at least 4 inches; and a spaced pair of guide members connected proximate opposite ends of the cushion member, each guide member defining a guide opening through the cushion member. The guide members can be axially spaced from opposite ends of the core element. Preferably the camel structure floats with the guide members approximately vertically oriented, facilitating free passage of hawser chains with rising and falling tides, a center of buoyancy being spaced from a center of gravity of the structure in a plan e approximately aligned with the guide members.

The core element can include a cylindrical member, opposite ends of the cylindrical member having respective cap members sealingly connected thereto, the length B being at least 20 feet. Preferably the core element has an outside core diameter C of not less than 10 inches for enhanced bending strength of the structure. The diameter C can be from approximately 12 inches to approximately 40 inches, the cushion member having an outside diameter D that is preferably from approximately 23 inches to approximately 47 inches for effectively spacing a moored vessel from dock structure. The cushion member can have an overall length of approximately 30 feet to 60 feet. Preferably the camel structure further includes a buoyant material substantially filling the core element and being sealingly enclosed therein for retaining buoyancy of the camel structure even in the unlikely event of a water leak developing in the core element. The buoyant material can include cured urethane foam.

Preferably the cushion member has a substantially unbroken outside surface, the cushion member being also thermally bonded to the core element. The cushion member can consist of a polymeric component and a process additive component, the polymeric component preferably consisting of polyethylene only for facilitating structural integrity of the cushion member, the additive component including an effective amount of an ultraviolet inhibitor. Preferably the polyethylene is from 60 to 100% percent by weight low-density polyethylene for enhanced buoyancy of the camel structure, the balance being high-density polyethylene, if necessary, for achieving a target melting temperature of the cushion member that is between approximately 440° F. and approximately 460° F.

In another aspect of the invention, a composite camel structure mold apparatus includes a mold unit having a tube member having a plurality of spaced side openings therein; a first end plate sealingly connectable to one end of the tube member for closure thereof, the first end plate having an injection inlet for connection to a source of pressurized molten plastic; and a second end plate sealingly connectable to an opposite end of the tube member for closure thereof, the second end plate having a spaced pair of openings therein, the tube member and the end plates defining a cavity envelope; a plurality of support members mountable to the tube member in inwardly projecting relation to the side openings for supporting a core element in radially spaced relation within the cavity envelope; a pair of spacer fittings for engaging the openings of the second end plate, the spacer fittings being adapted for receiving respective coolant pipes of the core element in axially spaced relation to the second end plate; and a coolant conduit for delivery of a cooling liquid into the core element through one of the spacer fittings and associated coolant pipe at a location axially closer to the first end plate than the second end plate.

The mold apparatus can further include means for supporting the mold unit with the second end plate elevated relative to the first end plate by a vertical distance, the vertical distance corresponding to an inclination of the tube member being between 2.5° and 10°. Preferably the side openings include axially spaced sets of side openings, the openings of each set including at least three openings being angularly spaced about a longitudinal axis of the tube member at increments of less than 180° for facilitating centering of the core element within the cavity envelope by the support members. Preferably the mold apparatus further includes a sleeve support for releasably holding a tubular member laterally extending between opposite sides of the mold, the tubular member defining a transverse camel structure opening.

In a further aspect of the invention, a method for forming a buoyant camel structure includes the steps of:

(a) providing an injection mold having an elongate cylindrical cavity;

(b) loading the mold with an elongate core element having an outside diameter of at least 10 inches and a length of at least 20 feet;

(c) centering the core element within the mold;

(d) injecting a polymeric composition into the mold for covering the core element to a thickness of at least 4 inches;

(e) feeding a coolant into the core element;

(f) producing a moving concentration of cooling thermal gradient between the polymeric composition and the coolant along the core element for for drawing the composition against the core and away from the mold while sequentially solidifying elements of the polymeric composition to form a cushion member while limiting thermal strain therein;

(g) draining the coolant from the core element;

(h) removing the core element with the cushion member from the mold; and (I) sealingly closing the core element to form the buoyant structure.

The step of producing a moving concentration can include the further step of inclining the mold, the feeding step including controlling a feed rate of the coolant, the moving concentration being associated with rising liquid level within the core element. Preferably the method includes the further step of filling the core element with a low-density water displacing material prior to the step of sealingly closing the core element for excluding water in case of a leak developing in outer portions of the structure. The step of injecting can include the steps of formulating the polymeric composition consisting of low density polyethylene and high density polyethylene in an amount effective for providing a melting temperature of between 440° F. and 460° F. The method can include further steps of loading cylindrical members into the mold for defining transverse guide openings and, preferably, orienting the mold with the cylindrical members in a vertical plane during the steps of injecting and cooling for effecting a center of buoyancy spaced from a center of gravity in a plane approximately aligned with the guide openings, whereby the camel structure floats with the guide openings approximately vertical.

DRAWINGS

These and other features, aspects, and advantages of the present invention will become better understood with reference to the following description, appended claims, and accompanying drawings, where:

DESCRIPTION

Figures 4, 6:
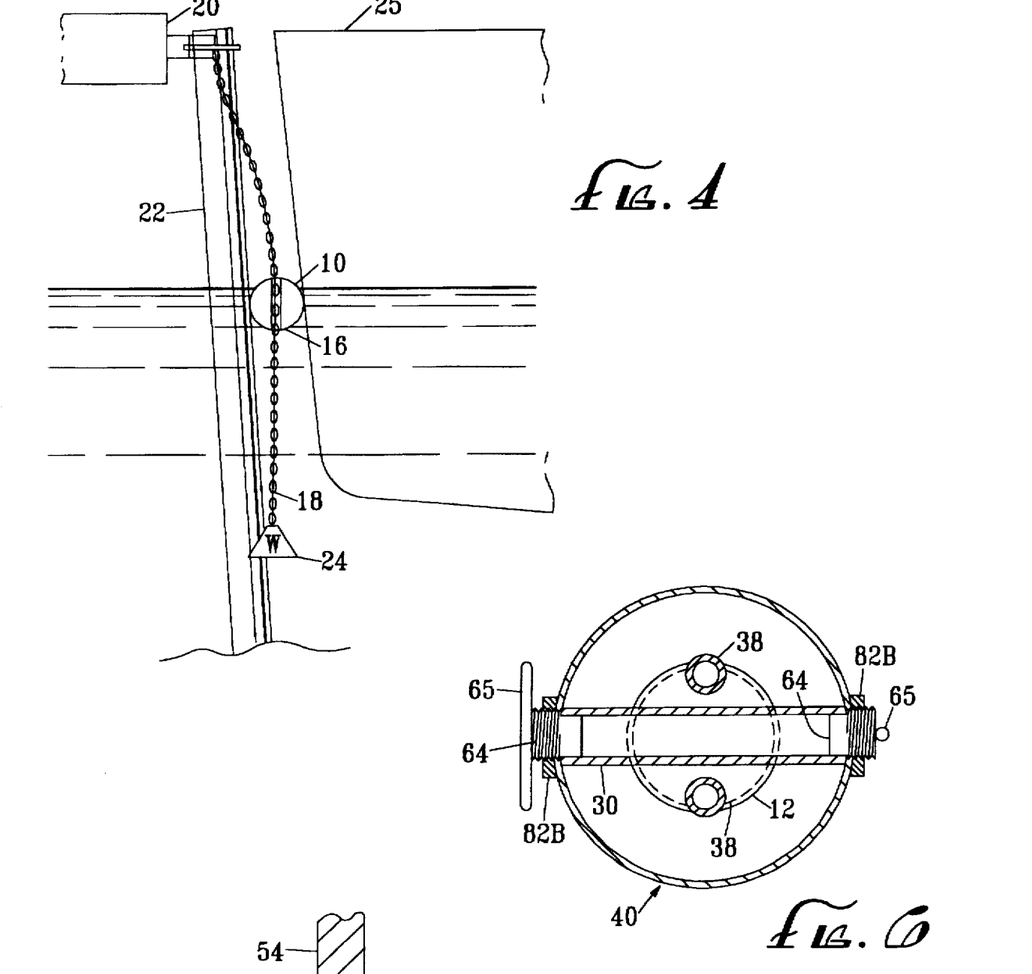
FIG. 4 is an elevational view showing the camel of FIG. 1 in use tethered to a dock between pilings thereof and a ship.
FIG. 6 is a lateral sectional view of the apparatus of FIG. 5 on line 6—6 therein.

The present invention is directed to a buoyant camel for protecting dock structures and moored watercraft from harmful contact. With reference to FIGS. 1–4 of the drawings, a camel structure 10 has a rigid core element 12, a generally cylindrical cushion member 14 that resiliently covers the core element, and a pair of Hawse pipes or guides 16 that are fixedly supported proximate opposite ends of the cushion member 14 for engaging respective tether chains 18. As used herein, the term "cylindrical" means having a surface that is generated by a straight line that moves parallel to a fixed line. Typically, the tether chains 18 are hung from spaced locations of a dock 20 having a row of pilings 22 as shown in FIG. 4, each chain 18 passing through a corresponding guide 16 and having a weight 24 suspended below the camel 10 at a free end of the chain 18. The camel structure 10 floats, traveling up and down on the chain 18 in response to changes in water level such as from wave and tide activity for protecting the pilings 22 from impact damage by a moored vessel 25.

Figure 1:
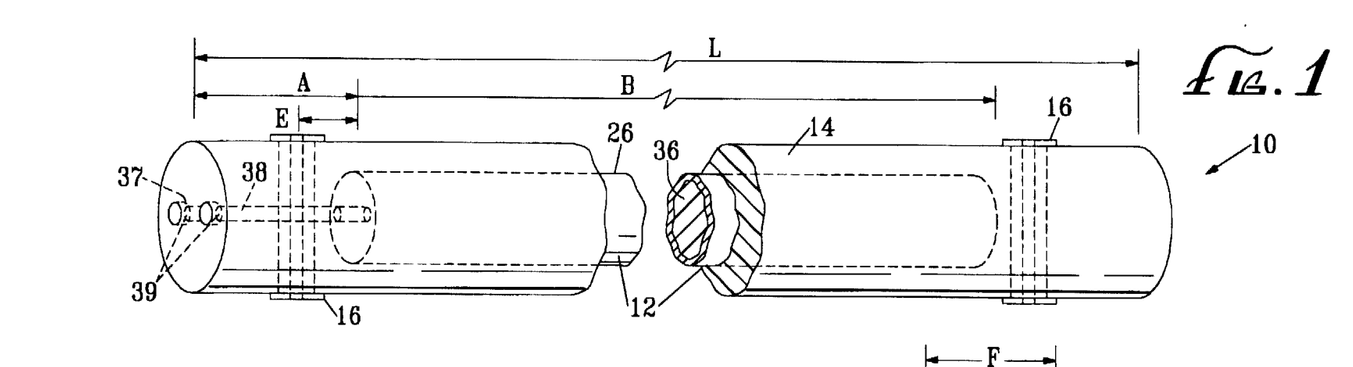
FIG. 1 is a fragmentary sectional perspective view of a camel of composite structure according to the present invention.
Figure 2:
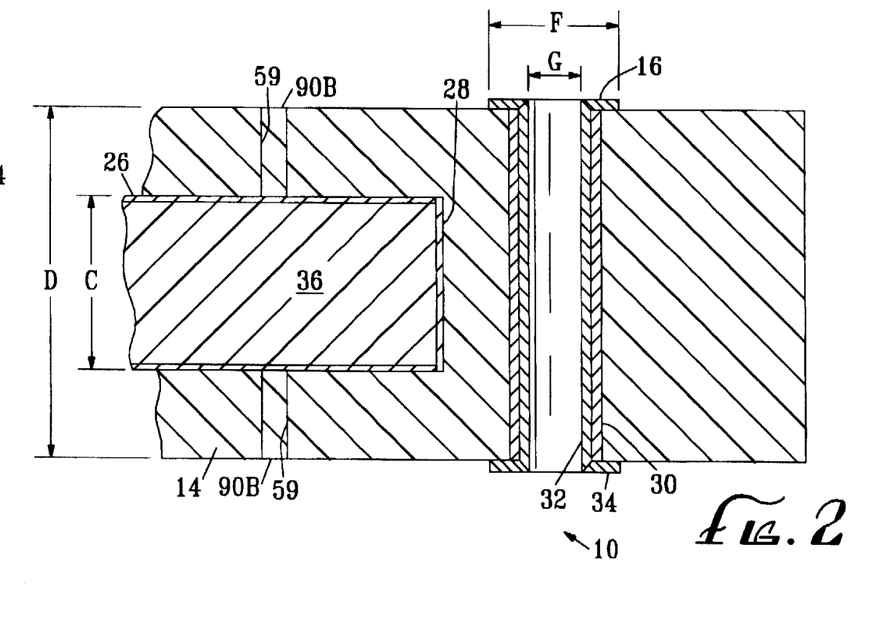
FIG. 2 is a detail sectional view of a portion of the camel of FIG. 1.
Figure 3:
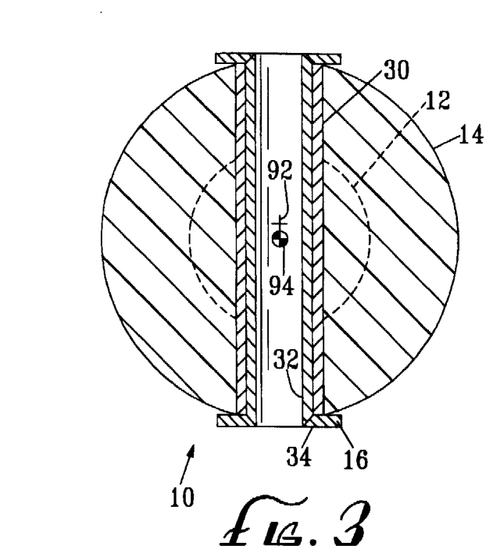
FIG. 3 is a lateral sectional view of the camel portion of FIG. 2.

As shown in FIGS. 1 and 2, an exemplary configuration of the camel structure 10 is generally circularly cylindrical, having an outside diameter D and a length L, the core element 12 including a tubular body member 26 and a pair of cap members 28 that are sealingly joined to the body member 26, the core element 12 having an outside diameter C and a length B, being symmetrically spaced by a distance A from each end of the camel structure 10. Each guide 16, being located within the distance A at a distance E from a respective one of the cap members 28, includes a tubular sleeve 30 that extends perpendicularly between opposite sides of the cushion member 14, a tubular liner 32 that extends through the sleeve 30, opposite ends of the liner 32 having a flange or collar 34 affixed thereto, the collars 34 having a flange diameter F. The liner 32 is substantially full-fitting within the sleeve 30, the collars 34 being closely spaced at opposite ends of the sleeve 30 for fixedly locating each guide 16 relative to the cushion member 14.

Preferably the core diameter C is at least 10 inches, the cushion member 14 covering the core element 12 to a thickness being (D−C)/2 of at least 2.5 inches but preferably 3.5 inches for effectively withstanding large impact deflections without damage to the camel structure 10, the dock, or an impacting vessel. The length L is at least 12 feet, being preferably much greater, up to approximately 60 feet. For example, the length L is contemplated to be selectively approximately 30 feet, 40 feet, and 50 feet. Over this range of lengths L, the outside diameter D can range upwardly from approximately 18 inches up to approximately 48 inches, being preferably approximately 23 inches. Correspondingly, the diameter C of the core element 12 can be from approximately 10 inches to approximately 40 inches. When the outside diameter D is 23 inches, the diameter C of the core element 12 is preferably between 12 inches and 18 inches, 16 inches being most preferred, a combination that provides a radial thickness of at least approximately 3.5 inches of the cushion member 14. It will be understood that the present invention advantageously provides effective protection over the above-described range of the length L, while facilitating low-cost production as described below by adoption of a single cross-sectional embodiment of the camel structure 10.

As further shown in the drawings, the core element 12 is optionally but preferably filled with a low-density core filler 36 for assuring that the camel structure 10 remains buoyant in the unlikely event of structural failure, such as an interruption in the cushion member 14 that allows water access to the core element 12, in combination with leakage of water into the core element 12. Suitable materials for the core filler 36 include closed-cell foam, a particularly suitable material being low-density polyurethane foam. As further described below, the core filler 36 is preferably introduced to the core element 12 subsequent to formation of the cushion member 14. Accordingly, the core element 12 is provided with a pair of pipe members 38 that extend from one of the cap members 28 within the cushion member 14 on opposite sides of one of the guides 16, to temporary access cavities 37 that are formed in the cushion member 14, the pipes 38 being in fluid communication with the interior of the core element 12, the temporary cavities 37 and pipe members 38 permitting flow of material for the filler 36 into the core element 12. Subsequent to the introduction of the core filler 36 as described below, each of the pipe members 38 is sealingly closed as indicated at 39, the temporary cavities 37 being closed flush with the main contour of the cushion member 14 as further described below.

Suitable materials for the guides 16 is corrosion-resistant steel, the sleeves 30 being 4-inch diameter schedule 120 pipe, the lines being 3-inch diameter schedule 80 pipe. The collars 34, having a thickness of approximately 1 inch, are welded to opposite ends of the liners 32.

According to the present invention, the above-described camel structure 10 is enabled by the cushion member 14 being formed of a particularly advantageous polymeric material, and further by the condition of the material as formed. Specifically, it has been discovered that formation of the cushion member 14 as an uninterrupted covering of the core element 12 is facilitated by using a composition of polyethylene being at least 60 percent low-density polyethylene (LDPE) and an effective amount of UV inhibitor, the composition not having any significant volume of filler material. It has further been discovered that production is facilitated by formulating the composition of the cushion member 14 to have a melting point within a predetermined target range by selectively including an effective amount of high-density polyethylene (HDPE). A preferred melting temperature of the composition is approximately 450° F., a corresponding target range being from approximately 445° F. to approximately 455° F. In order to achieve the target range, the HDPE can range from zero to approximately 40%, the balance of the polymeric component of the composition being LDPE.

In a further aspect, formation of the cushion member 14 as an uninterrupted covering of the core element 12 is facilitated by thermally forming the composition of the cushion member 14 about the core element 12 in a state of low tensile strain. Particularly, it has been discovered that low tensile strain, and consequent integrity of the cushion member 14 being an uninterrupted covering of the core element 12, is facilitated by a sweeping or moving process of cooling and solidifying of the composition by correspondingly dynamically cooling the core element 12. In other words, a moving pattern of concentrated thermal gradient is applied to the core element 12 as further described below.

Figure 5:
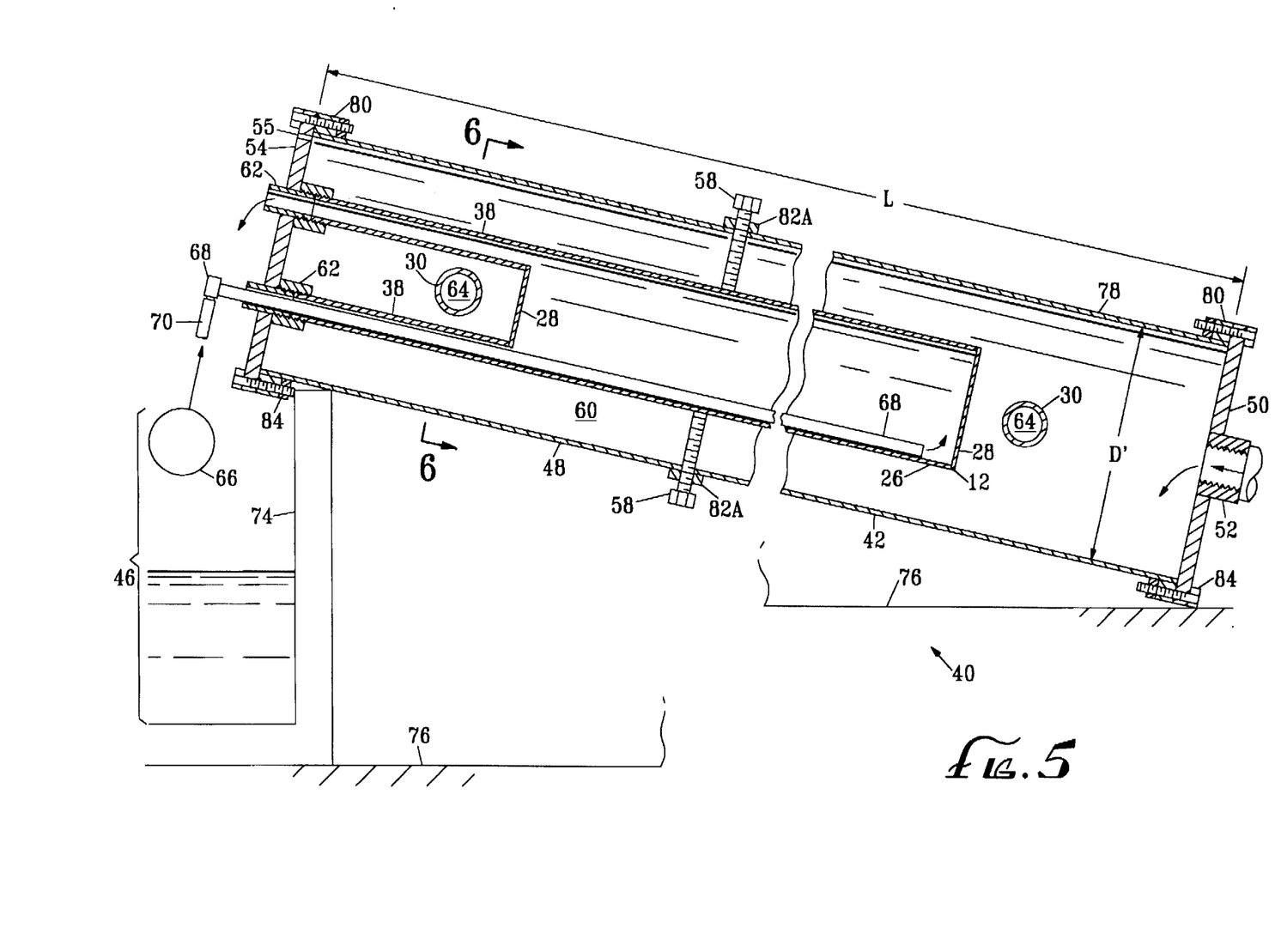
FIG. 5 is a longitudinal sectional elevational view of apparatus for forming structure of the camel of FIG. 1.
Figure 7:
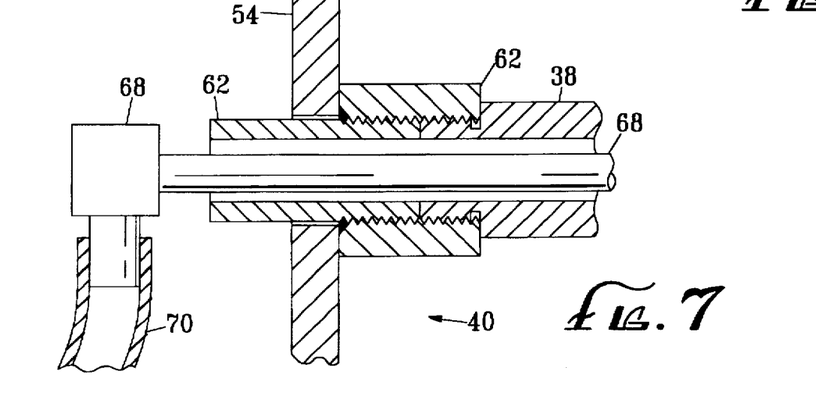
FIG. 7 is a detail longitudinal sectional view of the apparatus of FIG. 5 within region 7 thereof.

With further reference to FIGS. 5–7, a mold apparatus 40 for forming the cushion member of the camel structure 10 includes a mold assembly 42, a conventional extruder press (not shown), and a cooling circuit 46. The mold assembly 42 is shown in FIGS. 5 and 6 rotated 90 degrees from a preferred orientation wherein the sleeves 30 lie in a vertical plane, for clarity. The mold assembly 42 includes a flanged tubular mold segment 48, an inlet plate 50 having an injection point 52 for connection to an outlet of the extruder press, a cover plate 54 having an exhaust vent 55 and a pair of openings 56 formed therein, a plurality of set screws 58 for centering the core element 12 within a main cavity 60 of the assembly 42, a pair of pipe adapters 62 that threadingly connect to the pipe members 36 and project through the openings 56 of the cover plate 54, and respective pairs of threaded sleeve inserts 64 for locating opposite ends of each of the sleeves 30, each insert 64 having a handle 65. (The exhaust vent 55 is shown at an upper extremity of the main cavity 60, but is in fact at that location when the mold assembly 42 is oriented with the sleeves 30 are in a vertical plane.) The cooling circuit 46 includes a supply 66 of chilled coolant, preferably water, a wand 68 for feeding the coolant through one of the pipe members 36, a flexible hose 70 fluid connected between the supply 66 and the wand 68, and an elevated support 72 for supporting the mold assembly 42 in an inclined orientation whereby the cover plate 54 is at a higher elevation than the inlet plate 50. As shown in FIG. 5, the support 72 is provided as one wall of a bath tub 74 that extends upwardly above a supporting surface 76 upon which rests the inlet plate 50, the bath tub 74 also serving as a coolant collector in the cooling circuit 46. The supply 66 preferably provides the chilled water at a temperature of from approximately 40° F. to approximately 50° F. A suitable height of the bath tub 74 is approximately 3 feet, the mold assembly 42 being inclined variously between approximately 8.5° and approximately 2.9° as the length L of the camel structure 10 ranges between 20 feet and 60 feet. It is believed that suitable inclination of the mold assembly 42 is obtained between approximately 2.5° and approximately 10°.

As further shown in FIG. 5, the mold segment 48 has an inside diameter D' and a length l, being a weldment of a mold tube 78, a pair of perforate flanges 80, and threaded bosses 82A and 82B, respectively, for the set screws 58 and the sleeve inserts 64. The diameter D' and the length l of the mold segment 48 correspond to the diameter D and length L of the camel structure 10, but with allowance for shrinkage of the material of the cushion member 14. For example, with the core diameter C being 16 inches and the inside diameter D' being 23.5 inches, the outside diameter D subsequent to cooling of the cushion member 14 is approximately 23.25 inches. Respective pluralities of flange fasteners 84 provide removable connections between the flanges 80 and the corresponding inlet and cover plates 50 and 54. Suitable materials for the mold tube 78 and the flanges 80 include mild steel of 0.25 inch and 2 inch thickness, respectively. It will be understood that additional counterparts of the mold segment 48, but not necessarily having the threaded bosses 82B, can be connected end-to-end with the segment 48 for selectively varying the length L of the camel structure 10.

Figure 8:
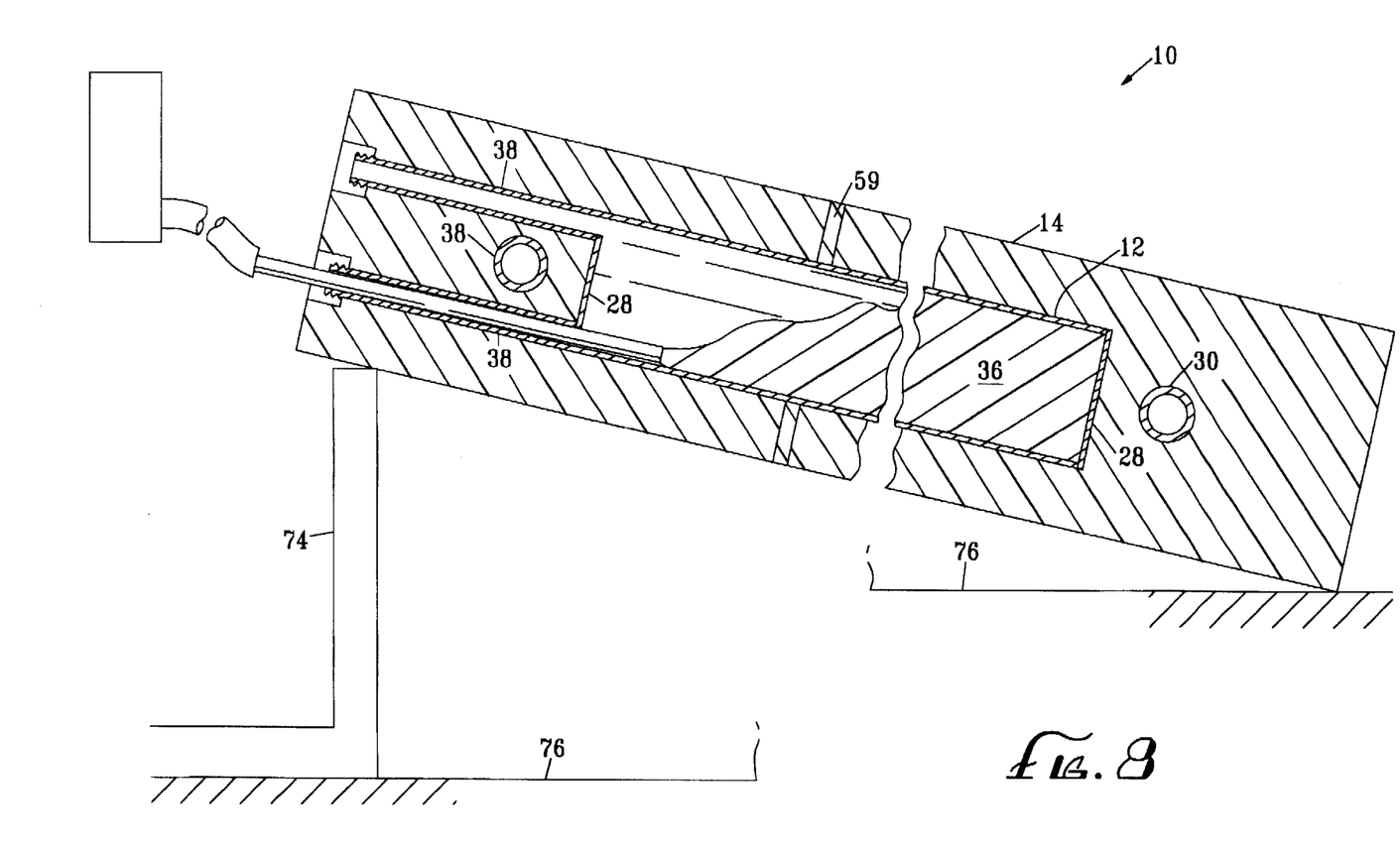
FIG. 8 is a sectional view as in FIG. 5, showing formation of a core filler material within the camel of FIG. 1.
Figure 9:
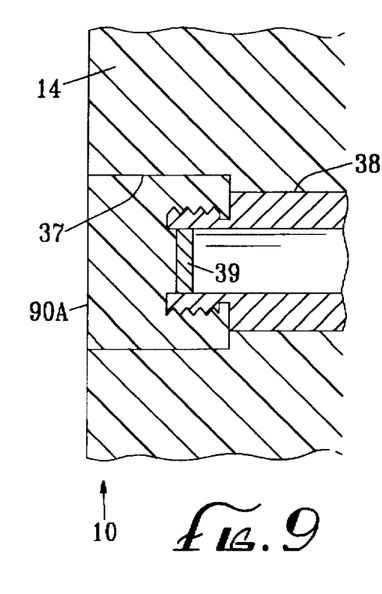
FIG. 9 is a sectional view as in FIG. 7, showing closure of the camel of FIG. 1 following formation of the core filler.

With further reference to FIGS. 8 and 9, the core filler 36 is formed by introducing a suitable low density material into the core element 12 through one of the pipe members 38 while venting the element 12 through one or both of the pipe members 38. As shown in FIG. 8, the partially formed camel structure 10, having been removed from the mold assembly 40, is supported in an inclined orientation with one extremity having the pipe members 38 being elevated (in a vertical plane) above the opposite extremity. A counterpart of the wand 68 is extended through one of the pipe members 38, being connected by a counterpart of the flexible hose 70 to a source 86 of liquidic foam material for the filler 36, the material being deposited beginning proximate a lower extremity of the body member 26, and continuing toward the pipe members 38, preferably as the wand 68 is gradually withdrawn from the body member 26. Preferably, the wand 68 is inserted into the lowermost of the pipe members 38 for facilitating venting through the top pipe member 38. A suitable material for the core filler 36 is closed-cell polyurethane foam, being commercially available from a variety of sources. The filler 36 is supplied in liquid form from the source 86, expanding to substantially fill the core element 12 from an initial volume that is approximately 30 percent thereof. Once the full volume of the filler 36 is transferred into the core element 12, the wand 68 is fully withdrawn from the nearly complete structure 10, and a pair of closure disks 39 are sealingly welded within the respective pipe members 38 as shown in FIG. 9. Upon curing, the core filler 36 imparts a water displacing capacity to the core element 12 that is independent of the preferred sealed construction thereof, for assuring that the camel structure 10 retains buoyancy even should a water leak develop in the outer structure of the core element 12. Finally, the temporary cavities 37 in the cushion member 14 are filled with respective plugs 90A of like material as shown in FIG. 7, and temporary cavities 59 that are formed by withdrawal of the set screws 58 from the mold assembly 42 are likewise filled with plugs 90B as shown in FIG. 2.

Figure 10:
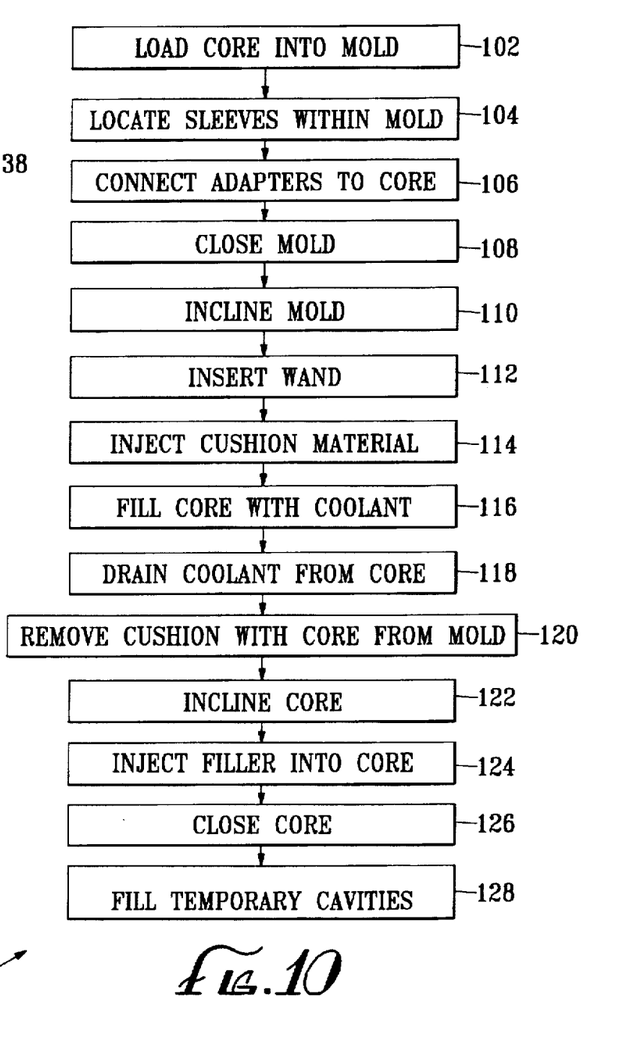
FIG. 10 is a flow chart for a process of forming the camel of FIG. 1.

With further reference to FIG. 10, a molding process 100 for forming the camel structure 10 includes a load mold step 102 wherein the core element 12 is placed within the mold assembly 42 with the cap members 28 equally spaced between opposite flanges 80 of the mold assembly 42, the element 12 being coaxially centered within the mold tube 78 by adjustment and tightening of the set screws 58. Next, the sleeves 30 are located within the mold tube 78 and retained by the sleeve inserts 64 in a load sleeve step 104, and the adapters 62 are threaded onto the pipe members 38 in a connect adapter step 106. Then, the inlet and cover plates 50 and 54 are installed in a close mold step 108, and the mold assembly 42 is propped up on the bath tub 74, with the pipe members 38 being horizontally aligned so that the sleeves 30 lie in a vertical plane, in an incline mold step 110, the wand 58 of the cooling circuit 46 being located in one of the pipe members 38 as shown in FIG. 5 in an insert wand step 112.

Next, the material of the cushion member 14 is fed into the main cavity 60 in an inject cushion step 114, the coolant being fed in a fill coolant step 116 through the wand 68, beginning preferably immediately after the cushion material is injected, the coolant being fed at a rate that is effective for progressively solidifying the cushion member 14 along the core element 12, thereby avoiding excessive tensile thermal strain of the cushion member. Thus a moving concentration of cooling thermal gradient is produced between the coolant and the injected material as the level of liquid rises within the core element 12, the coolant eventually overflowing from the pipe members 38, through the pipe adapters 62, and into the bath tub 72. In this process, the material of the cushion member 14 is drawn against the core structure 12 and away from surfaces of the mold assembly 42 that define the main cavity 60.

Preferably the camel structure 10 is configured for floating in an upright position wherein the guides 16 are vertically oriented for facilitating passage of the chains 18 therethrough during rising and falling tides. For this purpose, the sleeves 30 are oriented in a vertical plane as described above during injection and cooling of the cushion member 14. In this orientation, the shrinkage of the material of the cushion 14 during solidification thereof is biased downwardly within the mold 42 by the operation of gravitational force, so that a center of buoyancy 92 of the camel structure 10 is vertically displaced above a center of gravity 94 thereof when the guides 16 are vertically oriented. If the core element 12 (with the filler 36) has a lower average density than the cushion member 14, the camel structure 10 will float in the same general orientation as in the molding of the cushion member 14 (but without the axial inclination). If the core element 12 has a higher average density than the cushion member, the camel structure 10 will float in an inverted orientation from that of the above-described molding, the guides 16 likewise being vertically oriented. In either case, the thickness of the cushion member 14 is reduced by the above-described shrinkage predominately along a vertical plane in which the guides 16 are oriented, the cushion member 14 advantageously having a greater thickness along opposite sides of the camel structure, for enhanced effectiveness in cushioning impacts from sideward directions as they are normally encountered.

Once a desired degree of cooling has been obtained, the wand 68 is withdrawn and the mold assembly 42 is oppositely inclined by raising the inlet plate 50 while maintaining the pipe members 38 vertically aligned in a drain coolant step 118, the coolant being drained into the bath tub 74. In an unload mold step 120, the cushion member 14 and the core element 12 are removed axially from mold assembly 42, the cover plate 54 being removed and the pipe adapters 62 being replaced by a suitable yoke device for applying pulling force to the pipe members 38.

In a penultimate phase of the method 100, the partially completed camel structure 10 is propped up in an incline core step 122 as shown in FIG. 8, and the core filler 36 is formed in an inject filler step 124, using the counterpart wand 68 to feed foam ingredients into the core element 12. The pipe members 38 are then welded shut with the closure disks 39 in a close core step 126, and the cushion member 14 is finished with the plugs 90A and 90B in a fill cavity step 128 wherein the temporary cavities 37 and 59 are filled with matching polyethylene material.

Lastly, the guides 16 are completed in an install guide step 130 by welding the collars 34 to opposite ends of the liners 32, the liners 32 being fitted into the sleeves 30 that extend between opposite sides of the cushion member 14.

The composition of the cushion member 14 has polymeric elements being preferably exclusively polyethylene as described above, together with process additives as described below. As used herein, the term "process additive" means a substance for enhancing the properties of the polymeric elements, and does not include filler material such as calcium carbonate. The composition preferably contains a process additive which can be a foaming or blowing agent in an amount of up to about 0.9% by weight to insure than when the cushion member 14 is made by extruding the plastic composition into a mold, as described above, the mold assembly 42 is completely filled. The foaming agent can be a chemical blowing agent such as azodicarbonamide. A suitable chemical blowing agent is available from Uniroyal of Middlebury, Conn., under the trade name Celogen AZ 130.

Other process additives of the composition can include a coupling agent, preferably a silane, for improved bonding between the cushion member 14 and the core element 12, and coupling between the LDPE and HDPE polymeric components of the plastic composition.

The plastic composition can also include a fungicide, typically in an amount of about 0.25% by weight, and an emulsifier, in an amount of from about 0.1% to 0.3% by weight. The use of emulsifier improves surface appearance of the product.

The composition can also contain a carbon black, generally a furnace black, as a colorant, to improve the physical properties, and as a UV stabilizer. The amount of carbon black used is generally about 2.5% by weight.

If desired or needed, the core element 12 and/or the mold assembly 42 can be preheated to be certain that the plastic material of the cushion member 14 flows to the cover plate 54 of the mold assembly 42 and complete fills the main cavity 60.

EXAMPLE

A dry blend of a polymeric composition as identified in Table 1 was prepared. The polymeric components of the composition were all recycled plastic. This material was fed into the injection point 52 of the mold assembly 42 as shown in FIG. 5 with the length l being 40 feet and the diameter D' being 24 inches, from an extruder commonly known as a "one by 32" extruder that is rated at 700 horsepower. The extruder temperature was maintained at about 430° F. to 475° F. to prevent degradation of the blowing agent, and the pressure in the extruder and die head was between about 500 psi and about 2500 psi. The core element 12 was a 36-foot long steel pipe having the diameter C of about 16 inches and a wall thickness of about ⅛ inch. It was necessary to extrude about 3600 pounds of the plastic composition of Table 1 into the mold. It took about 90 minutes to accomplish this. Neither the core element 12 nor the mold assembly 42 were preheated.

TABLE I

| Plastic Composition | |
| --- | --- |
| | Wt %[1] |
| Polymeric Elements | |
| Low density polyethylene | 95 |
| High density polyethylene | 5 |
| | 100 |
| Additives | |
| Furnace carbon black | 2.5 |
| Foaming agent[2] | 0.7 |

[1]Based on total weight of the polymeric elements
[2]Celogen AZ 130 from Uniroyal The camel structure 10 of the present invention is immune to marine borer attack, and thus requires no further protection, such as creosote or plastic sheathing, being practically maintenance free. The structure 10 is abrasion resistant, and thus has excellent effectiveness without any added protective covering.

The camel structure 10 is chemically inert, so it can last indefinitely. It does not react with sea water, is corrosion free, is substantially immune to the effects of light, is not bothered by most petroleum products, and is not subject to dry rot. Because it can be made with recycled plastic, it is an environmentally sound investment.

In some military based naval applications, it is undesirable for a camel structure to be electro-magnetically sensitive. In such applications the core element 12 can be formed with non-magnetic materials, such as carbon-reinforced plastic. The structural core element 12 can also be developed by using fiberglass reinforcing rods.

Although the present invention has been described in considerable detail with reference to certain preferred versions thereof, other versions are possible. For example, the center of buoyancy 92 can be displaced in the plane of the guides 16 from the center of gravity 94 alternatively by appropriately offsetting the core element 12 off-center in the mold 42 while injecting and solidifying the cushion member 14, and/or by providing ballast or floatation elements within the structure 10. Therefore, the spirit and scope of the appended claims should not necessarily be limit to the description of the preferred versions contained herein.

What is claimed is:

1. A composite camel structure comprising:
   (a) an elongate hollow, rigid core element having a thickness of not less than 8 inches and a core length B of not less than 16 feet;
   (b) an elongate resilient cushion member affixed to and sealingly surrounding the core element and having a thickness of not less than 2.5 inches over the core element; and
   (c) a pair of parallel-spaced, transversely oriented guide members extending between opposite sides of the cushion member, each guide member defining a guide opening through the cushion member.

2. The camel structure of claim 1, wherein the guide members are in axially spaced relation to the core element.

3. The camel structure of claim 1, having a center of buoyancy spaced from a center of gravity thereof in a plane approximately aligned with the guide members thereby effecting flotation of the camel structure with the guide members approximately vertically oriented.

4. The camel structure of claim 1, wherein the core element comprises a cylindrical member, opposite ends of the cylindrical member having respective cap members sealingly connected thereto, the length B being at least 20 feet.

5. The camel structure of claim 4, wherein the core element has an outside core diameter C of not less than 10 inches.

6. The camel structure of claim 5, wherein the diameter C is approximately 16 inches, and the cushion member has an outside diameter D of at least 23 inches.

7. The camel structure of claim 6, wherein the cushion member has an overall length of approximately 40 feet.

8. The camel structure of claim 4, further comprising a buoyant material filling the core element and being sealingly enclosed therein.

9. The camel structure of claim 8, wherein the buoyant material comprises cured urethane foam.

10. The camel structure of claim 1, wherein the cushion member has an unbroken outside surface, the cushion member being thermally bonded to the core element.

11. The camel structure of claim 10, wherein the cushion member consists of a polymeric component and an additive component, the polymeric component consisting of polyethylene, the additive component including an effective amount of an ultraviolet inhibitor.

12. The camel structure of claim 11, wherein the polyethylene consist of at least 60 percent by weight low-density polyethylene.

13. The camel structure of claim 12, wherein the cushion member has a melting temperature of between approximately 440° F. and approximately 460° F., the polyethylene optionally including high-density polyethylene in an amount effective for the cushion member to have the melting temperature of between approximately 440° F. and approximately 460° F.

14. A composite camel structure comprising:

(a) an elongate hollow, rigid core element comprising a cylindrical member, opposite ends of the cylindrical member having respective cap members sealingly connected thereto, the core element having a core length B of at least 20 feet, and an outside core diameter C of approximately 16 inches;

(b) a buoyant material filling the core element and being sealingly enclosed therein, the buoyant material comprising cured urethane foam;

(c) an elongate resilient cushion member affixed to and sealingly surrounding the core element and having a thickness of not less than 3.5 inches over the core element, the cushion member having an unbroken outside surface, the cushion member being thermally bonded to the core element, the cushion member consisting of a polymeric component and an additive component, the polymeric component consisting of polyethylene consisting of at least 60 percent by weight low-density polyethylene, the additive component including an effective amount of an ultraviolet inhibitor; and (d) a pair of parallel-spaced, transversely oriented guide members extending between opposite sides of the cushion member in axially spaced relation to the core element, each guide member defining a guide opening through the cushion member.

15. A method for forming the camel structure of claim 1, comprising the steps of:

(a) providing an injection mold having an elongate cylindrical cavity;

(b) loading the mold with the core element;

(c) centering the core element within the mold;

(d) injecting a polymeric composition into the mold thereby covering the core element;

(e) feeding a coolant into the core element;

(f) producing a moving concentration of cooling thermal gradient between the polymeric composition and the coolant along the core element for drawing the composition against the core and away from the mold while sequentially solidifying elements of the polymeric composition to form the cushion member while limiting thermal strain therein;

(g) draining the coolant from the core element;

(h) removing the core element with the cushion member from the mold; and (i) sealingly closing the core element to form the camel structure as a buoyant body.

16. The method of claim 15, wherein the step of producing a moving concentration comprises the further step of inclining the mold, and the feeding step comprises controlling the feed rate of the coolant, the moving concentration being associated with rising liquid level within the core element.

17. The method of claim 15, comprising the further step of filling the core element with a water displacing material prior to the step of sealingly closing the core element.

18. The method of claim 15, wherein the step of injecting comprises the steps of formulating the polymeric composition to consist of low density polyethylene having a melting temperature of between 440° F. and 460° F. and, optionally high density polyethylene, in an amount effective for providing the melting temperature of between 440° F. and 460° F.

19. The method of claim 15, comprising the further steps of:

(a) loading the mold with the guide member for defining the guide openings; and (b) during the injecting and cooling steps, orienting the mold with the cylindrical members in a vertical plane for producing a center of buoyancy spaced from a center of gravity of the camel structure to thereby effect flotation with the guide passages approximately vertically oriented.

* * * * *